(No Model.)
C. W. GRANT.
SANITARY COMMODE.
No. 594,789. Patented Nov. 30, 1897.
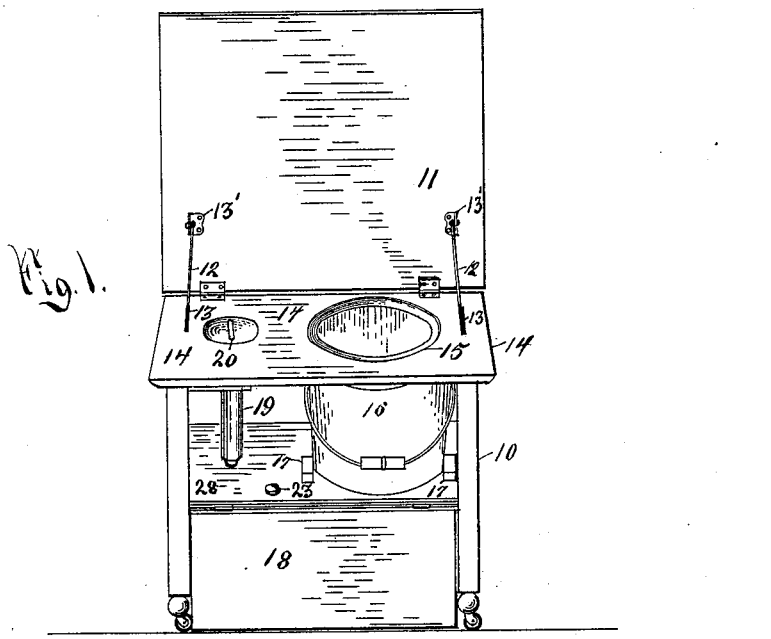
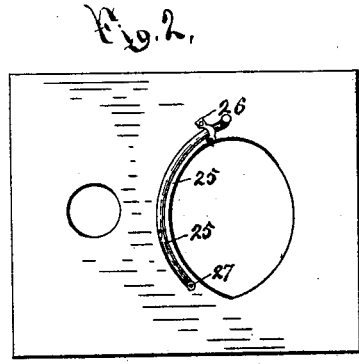
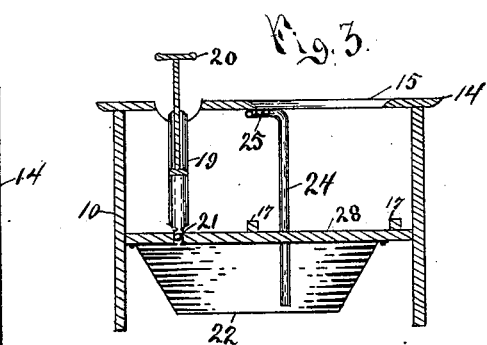
Witnesses
N. E. Thomas
C. W. Warren
Inventor
Charles W. Grant
By His Attorneys
Harris & Baldwin

UNITED STATES PATENT OFFICE.

CHARLES W. GRANT, OF JAMESTOWN, NEW YORK.

SANITARY COMMODE.

SPECIFICATION forming part of Letters Patent No. 594,789, dated November 30, 1897.

Application filed February 13, 1897. Serial No. 623,295. (No model.)

*To all whom it may concern:*

Be it known that I, CHARLES W. GRANT, a citizen of the United States, residing in the city of Jamestown, in the county of Chautauqua and State of New York, have invented certain new and useful Improvements in Sanitary Commodes; and I do hereby declare that the following is a full, clear, and exact description of the invention, which will enable others skilled in the art to which it appertains to make and use the same.

The object of my invention is to make a convenient and effective sanitary commode or portable closet for use in sick-rooms or buildings which have not the convenience of water-closets and by means of which the bad odors and deleterious effects of the excretions are instantly dispelled, all of which will be fully understood by this specification and the accompanying drawings, in which—

Figure 1 is a perspective of my commode opened up to show interior and seat. Fig. 2 is a view of the under side of the seat-board and arrangement of disinfectant-pipe. Fig. 3 is a lengthwise sectional view of commode.

Similar numerals in the several views refer to similar parts.

In the drawings, 10 represents my commode-frame, made of suitable wood, mounted on casters and finished as desired.

11 is the lid, which is shown raised in Fig. 1, and when so raised and firmly held by the metal slides 12 12, working in slots 13 13 at their lower end, and by fixtures 13' 13' at their upper end, forms a strong and comfortable back to recline against. Seat-board 14 has two openings beside slots 13 13—one for air-pump 19 and the other for the user and numbered 15. Beneath opening 15 is a pail 16 to receive the excretions, which pail is held in position under opening 15 by blocks 17 17. Air-pump 19 connects by its ball-valve 21 (see Fig. 3) with the disinfectant-reservoir 22. The ball-valve prevents the air from coming back into the pump when once forced into the air-tight reservoir and thus admits of as high pressure as desired upon the liquid disinfectant to force it up through the lead or other non-corrosive metal pipe 24 and out through the minute openings 25 25 25 and into pail 16 as desired.

Pipe 24 extends near enough to the bottom of reservoir 22 to draw out its entire contents. It passes up through the metal upper side of air-tight reservoir 22 with an air-tight joint and through a hole in the rear part of partition 28 to the rear of opening 15 and the under side of seat-board 14 and is there bent at right angles and passes in a curve around the seat-hole, as shown in Fig. 2, and is fastened to the under side of the seat-board by metal strap 26 and screw 27, which screw passes through the flattened end of pipe 24. The flattening of this end serves the double purpose of making a fastening and stopping the end, making it water-tight. Around the inner side of this curved pipe I make the minute perforations 25 25 25 for the liquid disinfectant to flow through and sprinkle the entire inside of the pail and its contents. Reservoir 22 is preferably made an air-tight metal case, with an enameled interior to prevent corrosion, and is attached to the under side of partition 28, as shown in Fig. 3, the small opening with screw-cap extending up through partition-board 28 for convenience in filling.

Fig. 3 shows door 18 dropped down in order to obtain access to pail 16 and filling-cap 23. The edge of partition-shelf 28 is raised a little above the upper edge of door 18 when dropped down for ease in withdrawing pail 16.

The user makes use of my commode or closet-seat the same as any closet-seat, only that as soon as the matter leaves the body he works the air-pump and forces the liquefied disinfectant upon the excretions in the pail, stopping at once all bad odors and deleterious effects, as stated.

Having fully described my invention, what I claim as new, and desire to secure by Letters Patent, is—

A sanitary commode or closet, consisting of box 10, cover 11 hinged thereto and provided with metal slides 12 12 for holding the cover, seat 14, having opening 15, air-pump 19 suitably mounted therein, shelf 28 having reservoir 22 secured to its under side, pipe 24, pail or removable receptacle 16, all arranged to operate in the manner and for the purpose set forth.

In evidence that I claim the foregoing I have hereunto set my hand in the presence of two witnesses.

CHARLES W. GRANT.

In presence of—
  N. E. THOMAS,
  C. W. WARREN.